United States Patent
Itoh

(10) Patent No.: US 11,829,551 B2
(45) Date of Patent: Nov. 28, 2023

(54) CONDUCTIVE MEMBER FOR TOUCH PANEL AND TOUCH PANEL

(71) Applicant: FUJIFILM Corporation, Tokyo (JP)

(72) Inventor: Shigehide Itoh, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/052,431

(22) Filed: Nov. 3, 2022

(65) Prior Publication Data
US 2023/0168766 A1    Jun. 1, 2023

(30) Foreign Application Priority Data
Nov. 29, 2021  (JP) .................................. 2021-192815

(51) Int. Cl.
*G06F 3/041* (2006.01)
*G06F 3/044* (2006.01)

(52) U.S. Cl.
CPC ........ *G06F 3/04164* (2019.05); *G06F 3/0445* (2019.05); *G06F 3/0446* (2019.05); *G06F 2203/04102* (2013.01)

(58) Field of Classification Search
CPC ...... G06F 3/0443; G06F 3/0446; G06F 3/041; G06F 3/0445; G06F 3/04164; G06F 2203/04102; G06F 2203/04103
See application file for complete search history.

(56) References Cited

U.S. PATENT DOCUMENTS

2020/0142540 A1*  5/2020  Rahmani ................ H05K 3/361
2020/0201482 A1*  6/2020  Weisse ................ G06F 3/04164

FOREIGN PATENT DOCUMENTS

JP      2016-194746 A    11/2016

* cited by examiner

*Primary Examiner* — Deeprose Subedi
(74) *Attorney, Agent, or Firm* — EDWARDS NEILS LLC; Jean C. Edwards, Esq

(57) ABSTRACT

A conductive member for a touch panel includes: a substrate; and a conductive layer that is disposed on at least one surface of the substrate, in which the conductive layer includes a plurality of detection electrodes, a plurality of lead wires led from the plurality of detection electrodes, and a plurality of external connection terminals connected to the plurality of lead wires, and a ratio of a thickness D1 of the external connection terminal to a thickness D2 of the lead wire satisfies $1.00 < D1/D2 \leq 3.00$.

7 Claims, 3 Drawing Sheets

CONDUCTIVE MEMBER FOR TOUCH PANEL AND TOUCH PANEL

CROSS-REFERENCE TO RELATED APPLICATIONS

The present application claims priority under 35 U.S.C. § 119 to Japanese Patent Application No. 2021-192815 filed on Nov. 29, 2021. The above application is hereby expressly incorporated by reference, in its entirety, into the present application.

BACKGROUND OF THE INVENTION

1. Field of the Invention

The present invention relates to a conductive member for a touch panel that is used as an electrode for detecting a touch operation.

In addition, the present invention also relates to a touch panel including the conductive member for a touch panel.

2. Description of the Related Art

In the related art, in various electronic apparatuses including portable information apparatuses such as a tablet computer or a smartphone, a touch panel where an input operation to an electronic apparatus can be performed through a so-called touch operation of allowing a finger, a stylus pen, or the like to contact or approach a screen is used.

For example, as disclosed in JP2016-194746A, this touch panel includes a conductive member where a plurality of detection electrodes for detecting the touch operation, a plurality of lead wires that are led from the plurality of detection electrodes, and a plurality of external connection terminals that are electrically connected to the plurality of lead wires are formed on a substrate.

SUMMARY OF THE INVENTION

Incidentally, in a case where the conductive member disclosed in JP2016-194746A is used as a touch panel, the conductive member is likely to be electrically connected to a display module or the like for displaying an image in many cases. In this case, the plurality of external connection terminals of the conductive member and wiring lines of a so-called flexible printed circuit (FPC) led from the display module are electrically connected to each other. The external connection terminal is likely to be electrically connected to a wiring line of the FPC or the like in many cases by being pressure-bonded through a so-called anisotropic conductive film (ACF). However, in order to prevent breakage in a case where the FPC is bent after the pressure bonding, the external connection terminal needs to have a thickness to some degree.

In addition, for example, in order to manufacture a touch panel having a curved touch surface, the substrate that supports the plurality of detection electrodes, the plurality of lead wires, and the plurality of external connection terminals is formed of a material having flexibility to impart flexibility to the conductive member. In this case, in a case where the plurality of lead wires are thick, the conductivity is improved. On the other hand, in a case where the conductive member is bent, there is a problem in that the plurality of lead wires are likely to be fractured.

Therefore, in order to prevent both of the breakage of the external connection terminal and the fracture of the lead wire, for example, a configuration where the external connection terminal is thick and the lead wire is thin may be considered. However, there may be a case where stress concentrates on a boundary portion between the external connection terminal and the lead wire such that the boundary portion is fractured.

The present invention has been made in order to solve the above-described problems, and an object thereof is to provide a conductive member for a touch panel where fracture of a lead wire can be suppressed while suppressing breakage of an external connection terminal, and a touch panel including the conductive member for a touch panel.

According to an aspect of the present invention, there is provided a conductive member for a touch panel comprising: a substrate; and a conductive layer that is disposed on at least one surface of the substrate, in which the conductive layer includes a plurality of detection electrodes, a plurality of lead wires led from the plurality of detection electrodes, and a plurality of external connection terminals connected to the plurality of lead wires, and a ratio $D1/D2$ of a thickness $D1$ of the external connection terminal to a thickness $D2$ of the lead wire satisfies Inequality (1).

$$1.00 < D1/D2 \leq 3.00 \tag{1}$$

It is preferable that the thickness of the external connection terminal is more than 1.00 μm.

It is preferable that the thickness of the lead wire is less than 1.00 μm.

It is preferable that the substrate is a transparent insulating substrate.

In addition, it is preferable that the substrate has flexibility.

According to another aspect of the present invention, there is provided a touch panel comprising the above-described conductive member for a touch panel.

According to the aspect of the present invention, the conductive member for a touch panel comprises: a substrate; and a conductive layer that is disposed on at least one surface of the substrate, in which the conductive layer includes a plurality of detection electrodes, a plurality of lead wires led from the plurality of detection electrodes, and a plurality of external connection terminals connected to the plurality of lead wires, and a ratio $D1/D2$ of a thickness $D1$ of the external connection terminal to a thickness $D2$ of the lead wire satisfies $1.00 < D1/D2 \leq 3.00$. Therefore, fracture of a lead wire can be suppressed while suppressing breakage of an external connection terminal.

DESCRIPTION OF THE PREFERRED EMBODIMENTS

Hereinafter, a conductive member for a touch panel and a touch panel according to the present invention will be described in detail based on a suitable embodiment shown in the accompanying drawings.

In the following description, a numerical range indicated by the expression "to" includes numerical values described on both sides. For example, in a case where "s is a numerical value t1 to a numerical value t2", the range s is a range including the numerical value t1 and the numerical value t2, which is expressed by a mathematical symbol $t1 \leq s \leq t2$.

Unless specified otherwise, the meaning of an angle such as "perpendicular" or "parallel" includes a case where an error range is generally allowable in the technical field.

"Transparent" represents that a light transmittance in a visible wavelength range of 400 nm to 800 nm is at least 40% or more, preferably 75% or more, more preferably 80% or more, and still more preferably 90% or more. The light transmittance is measured using "Plastics—Determination of Total Luminous Transmittance And Reflectance" defined by JIS K 7375:2008.

Embodiment

Figure 1:
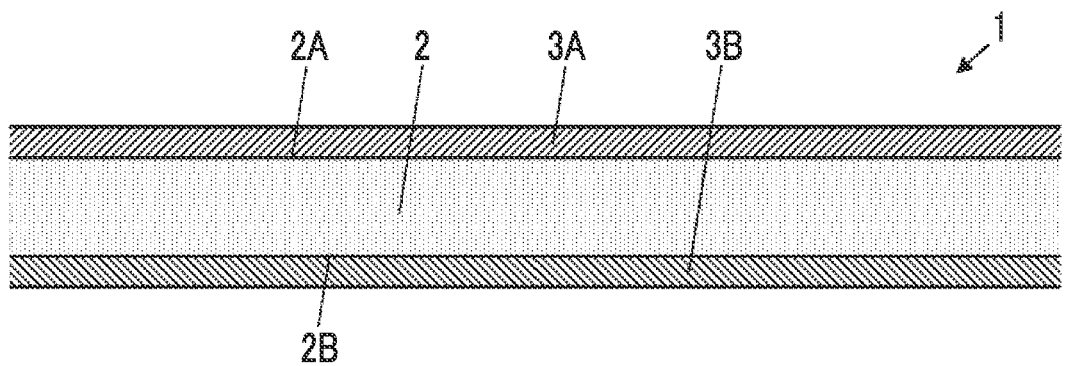
FIG. 1 is a partial cross-sectional view showing a conductive member for a touch panel according to a first embodiment.

FIG. 1 shows a configuration of a conductive member 1 for a touch panel according to the embodiment of the present invention.

The conductive member 1 for a touch panel includes: a substrate 2 that includes a first surface 2A and a second surface 2B forming the front and the back; a first conductive layer 3A that is disposed on the first surface 2A of the substrate 2; and a second conductive layer 3B that is disposed on the second surface 2B of the substrate 2. The substrate 2 has insulating properties, and the first conductive layer 3A and the second conductive layer 3B are electrically insulated from each other. In addition, the substrate 2 has flexibility, and the conductive member 1 for a touch panel has flexibility conforming to the flexibility of the substrate 2.

In the conductive member 1 for a touch panel, a cover member (not shown) is bonded to a surface on the first conductive layer 3A side, and a display module (not shown) is bonded to a surface on the second conductive layer 3B side. As a result, the conductive member 1 for a touch panel can be used as a touch panel display device (not shown). In this case, a finger, a stylus pen, or the like of a user that contacts or approaches the cover member is detected, and a touch operation by the user is detected.

Figure 2:
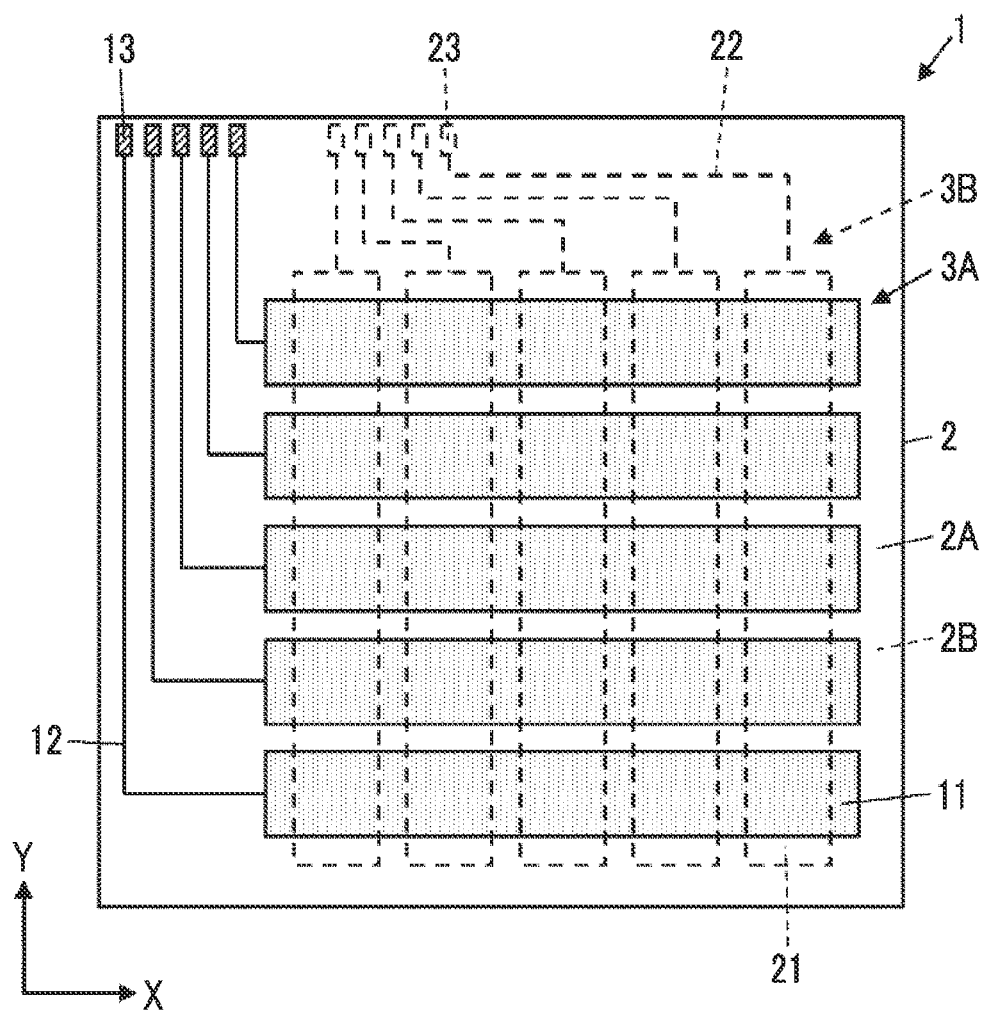
FIG. 2 is a plan view showing the conductive member for a touch panel according to the first embodiment.

FIG. 2 is a plan view showing the conductive member 1 for a touch panel.

The first conductive layer 3A includes: a plurality of first detection electrodes 11 for detecting a touch operation that extend in a predetermined X direction and are arranged in a Y direction perpendicular to the X direction; a plurality of first lead wires 12 that are electrically connected to the plurality of first detection electrodes 11; and a plurality of first external connection terminals 13 that are electrically connected to the plurality of first lead wires 12.

The second conductive layer 3B includes: a plurality of second detection electrodes 21 for detecting a touch operation that extend in the Y direction and are arranged in the X direction; a plurality of second lead wires 22 that are electrically connected to the plurality of second detection electrodes 21; and a plurality of second external connection terminals 23 that are electrically connected to the plurality of second lead wires 22.

A region where the plurality of first detection electrodes 11 are disposed and a region where the plurality of second detection electrodes 21 are disposed overlap each other with the substrate 2 interposed therebetween in a Z direction perpendicular to both of the X direction and the Y direction.

Figure 3:
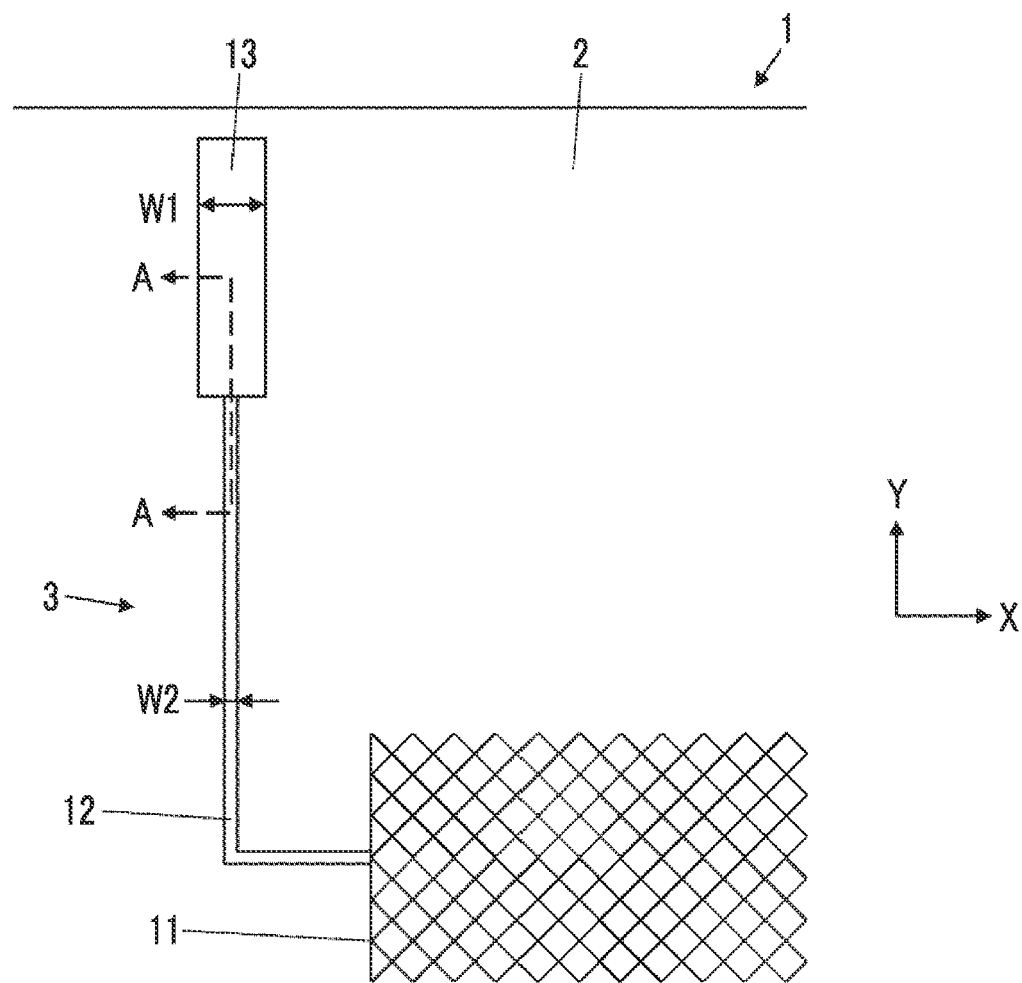
FIG. 3 is an enlarged view showing a part of a first conductive layer according to the first embodiment.

FIG. 3 is an enlarged view showing a part of a first conductive layer according to the first embodiment. The first lead wire 12 has a line width W2 of, for example, 5.0 μmm or more and 30.0 μm or less. In addition, the first external connection terminal 13 has a terminal width W1 of, for example, 300.0 μmm or more and 500.0 μm or less. For convenience of description, FIG. 3 shows only one set including the first detection electrode 11, the first lead wire 12, and the first external connection terminal 13.

Figure 4:
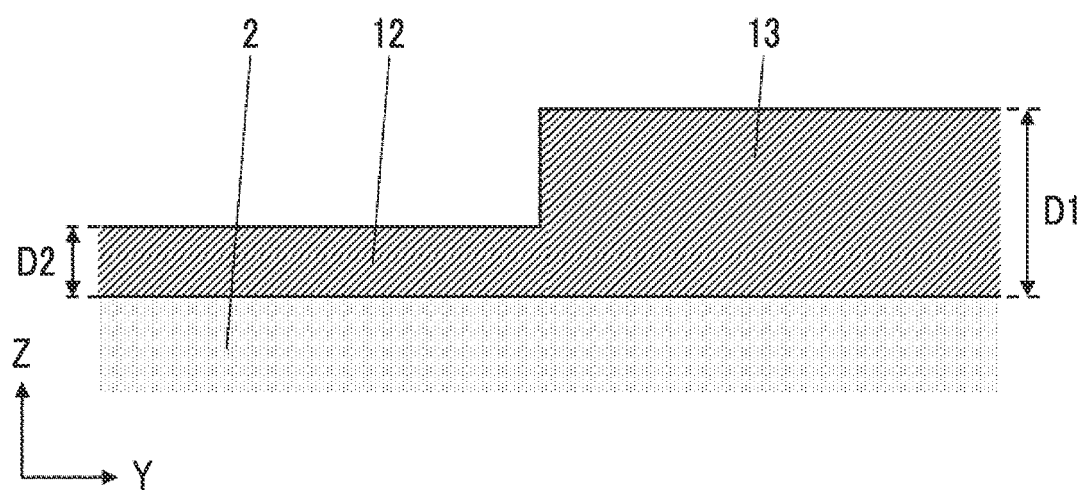
FIG. 4 is a cross-sectional view showing a boundary portion between the first lead wire and the first external connection terminal in the first embodiment.

FIG. 4 is a cross-sectional view showing the first lead wire 12 and the first external connection terminal 13 extending in the Y direction, taken along line A-A parallel to the Y direction in FIG. 3 to include a boundary portion between the first lead wire 12 and the first external connection terminal 13. A ratio D1/D2 of a thickness D1 of the first external connection terminal 13 to a thickness D2 of the first lead wire 12 is more than 1.00 and 3.00 or less. That is, the thickness D2 of the first lead wire 12 and the thickness D1 of the first external connection terminal 13 satisfy Inequality (1).

$$1.00 < D1/D2 \leq 3.00 \qquad (1)$$

Incidentally, in general, a conductive member used as a touch panel is likely to be electrically connected to a display module or the like for displaying an image in many cases. In this case, the plurality of external connection terminals of the conductive member and wiring lines of a so-called flexible printed circuit (FPC) led from the display module are electrically connected to each other. The external connection terminal is likely to be electrically connected to a wiring line of the FPC or the like in many cases by being pressure-bonded through a so-called anisotropic conductive film (ACF). However, in order to prevent breakage in a case where the FPC is bent after the pressure bonding, the external connection terminal needs to have a thickness to some degree.

In addition, for example, in order to manufacture a touch panel having a curved touch surface, the substrate that supports the plurality of detection electrodes, the plurality of lead wires, and the plurality of external connection terminals is formed of a material having flexibility to impart flexibility to the conductive member. In this case, in a case where the plurality of lead wires are thick, the conductivity is improved. On the other hand, in a case where the conductive member is bent, there is a problem in that the plurality of lead wires are likely to be fractured.

Therefore, in order to prevent both of the breakage of the external connection terminal and the fracture of the lead wire, for example, a configuration where the external connection terminal is thick and the lead wire is thin may be considered. However, there may be a case where stress concentrates on a boundary portion between the external connection terminal and the lead wire such that the boundary portion is fractured.

The present inventor found that, by designing the thickness D1 of the first external connection terminal 13 and the thickness D2 of the first lead wire 12 to satisfy Inequality (1), concentration of stress on a boundary portion between the first external connection terminal 13 and the first lead wire 12 is suppressed, and while suppressing the breakage of the first external connection terminal 13 during pressure bonding of an external device (not shown) such as a display module and the first external connection terminal 13, the fracture of the first lead wire 12 during bending of the conductive member 1 for a touch panel can be suppressed. In a case where the thickness D1 of the first external connection terminal 13 and the thickness D2 of the first lead wire 12 do not satisfy Inequality (1), stress is likely to concentrate on a boundary portion between the first external connection terminal 13 and the first lead wire 12, and the boundary portion is likely to be fractured.

Here, by designing the thickness D1 of the first external connection terminal 13 to be, for example, more than 1.00 μmm, the first external connection terminal 13 has a sufficient strength. Therefore, the breakage of the first external connection terminal 13 is further suppressed.

In addition, by designing the thickness D1 of the first lead wire 12 to be, for example, less than 1.00 μmm, the first lead wire 12 has sufficient flexibility. Therefore, the fracture of the first lead wire 12 caused by the bending of the conductive member 1 for a touch panel is further suppressed.

In addition, although not shown in the drawing, a ratio E1/E2 of a thickness E1 of the second external connection terminal 23 to a thickness E2 of the second lead wire 22 is more than 1.00 and 3.00 or less. That is, the thickness E2 of the second lead wire 22 and the thickness E1 of the second external connection terminal 23 satisfy Inequality (2).

$$1.00 < E1/E2 \leq 3.00 \qquad (2)$$

By designing the thickness E1 of the second external connection terminal 23 and the thickness E2 of the second lead wire 22 to satisfy Inequality (2), as in the first external connection terminal 13 and the first lead wire 12, concentration of stress on a boundary portion between the second external connection terminal 23 and the second lead wire 22 is suppressed, and while suppressing the breakage of the second external connection terminal 23 during pressure bonding of an external device (not shown) such as a display module and the second external connection terminal 23, the fracture of the second lead wire 22 during bending of the conductive member 1 for a touch panel can be suppressed.

As described above, in the conductive member 1 for a touch panel according to the embodiment of the present invention, the thickness D1 of the first external connection terminal 13 and the thickness D2 of the first lead wire 12 satisfy Inequality (1), and the thickness E1 of the second external connection terminal 23 and the thickness E2 of the second lead wire 22 to satisfy Inequality (2). Therefore, while suppressing the breakage of the first external connection terminal 13 and the second external connection terminal 23, the fracture of the first lead wire 12 and the second lead wire 22 can be suppressed.

Figure 5:
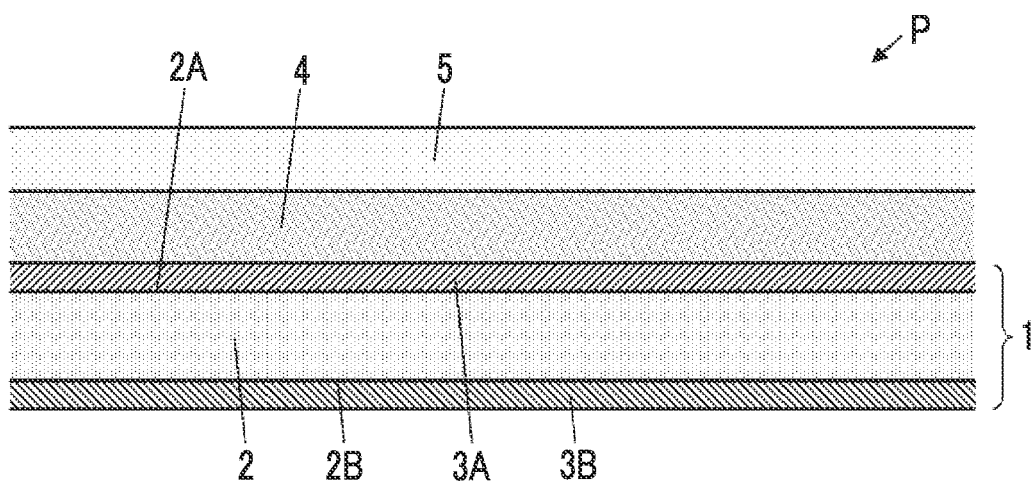
FIG. 5 is a partial cross-sectional view showing a touch panel according to the first embodiment.

In addition, a touch panel P can be formed, for example, by bonding a transparent cover member 5 to the conductive member 1 for a touch panel through a pressure sensitive adhesive 4 as shown in FIG. 5. The touch panel P includes the conductive member 1 for a touch panel. Therefore, for example, even in a case where the touch panel P is electrically connected to a display module (not shown) by pressure-bonding the plurality of first external connection terminals 13 and the plurality of second external connection terminals 23 to wiring lines led from the display module, the cover member 5 has a curved shape. Therefore, even in a case where the conductive member 1 for a touch panel is disposed in a curved state, the breakage of the plurality of first external connection terminals 13 and the plurality of second external connection terminals 23 is suppressed, the fracture of the plurality of first lead wires 12 and the plurality of second lead wires 22 is suppressed, and the fracture of the boundary portion between the first external connection terminal 13 and the first lead wire 12 and the fracture of the boundary portion between the second external connection terminal 23 and the second lead wire 22 are suppressed.

In a case where the touch panel P manufactured using the conductive member 1 for a touch panel is disposed on a display module (not shown), it is preferable that the substrate 2 is a transparent insulating substrate such that a user of the touch panel P can check an image displayed on the display module. In this case, it is preferable that the substrate 2 has, a total light transmittance of 85% to 100%. The total light transmittance is measured using "Plastics—Determination of Total Luminous Transmittance And Reflectance" defined by JIS K 7375:2008.

In addition, in the above description, the first conductive layer 3A is disposed on the first surface 2A of the substrate 2, and the second conductive layer 3B is disposed on the second surface 2B of the substrate 2. However, both of the first conductive layer 3A and the second conductive layer 3B may be disposed on only the first surface 2A side or only the second surface 2B side of the substrate 2, for example, a configuration where the second conductive layer 3B is disposed on the first conductive layer 3A through an insulating layer.

In addition, in the above description, the conductive member 1 for a touch panel includes the first conductive layer 3A and the second conductive layer 3B. However, the conductive member 1 for a touch panel may include only any one of the first conductive layer 3A or the second conductive layer 3B.

In either case, the first conductive layer 3A or the second conductive layer 3B is disposed on only one surface of the substrate 2.

Hereinafter, each of the members forming the conductive member 1 for a touch panel according to the embodiment will be described.

Substrate 2

The kind of the substrate 2 is not particularly limited as long as it is a member that can support the first conductive layer 3A and the second conductive layer 3B. Examples of the substrate 2 include a plastic substrate, a glass substrate, and a metal substrate. Among these, a plastic substrate is preferable.

As the substrate 2, a substrate having flexibility is preferable from the viewpoint of excellent bendability. Examples of the substrate having flexibility include the plastic substrate.

The thickness of the substrate 2 is not particularly limited and is likely to be 25 μm to 500 μm.

As a material forming the substrate 2, a resin having a melting point of about 290° C. or lower such as polyethylene terephthalate (PET) (258° C.), polycycloolefin (134° C.), polycarbonate (250° C.), an acrylic film (128° C.), polyethylene naphthalate (269° C.), polyethylene (135° C.), polypropylene (163° C.), polystyrene (230° C.), polyvinyl chloride (180° C.), polyvinylidene chloride (212° C.), or triacetyl cellulose (290° C.) is preferable, and PET, polycycloolefin, or polycarbonate is more preferable.

In particular, PET is preferable from the viewpoint of excellent adhesiveness between the first conductive layer 3A and the second conductive layer 3B. The numerical value in the brackets is the melting point or the glass transition temperature.

The total light transmittance of the substrate 2 is preferably 85% to 100%. The total light transmittance is measured using "Plastics—Determination of Total Luminous Transmittance and Reflectance" defined by Japanese Industrial Standards (JIS) K 7375:2008.

Examples of a suitable aspect of the substrate 2 include a treated substrate that undergoes at least one treatment selected from the group consisting of an atmospheric pressure plasma treatment, a corona discharge treatment, and an ultraviolet irradiation treatment. By performing the above-described treatment, a hydrophilic group such as an OH group is introduced into the treated surface of the substrate 2 such that such that the adhesiveness between the substrate 2 and the first conductive layer 3A and the adhesiveness between the substrate 2 and the second conductive layer 3B are improved. In addition, the atmospheric pressure plasma treatment is preferable among the above-described treatments from the viewpoint of further improving the adhesiveness between the substrate 2 and the first conductive layer 3A and the adhesiveness between the substrate 2 and the second conductive layer 3B.

Undercoat Layer

In order to improve the adhesiveness between the substrate 2 and the first conductive layer 3A and the adhesiveness between the substrate 2 and the second conductive layer 3B, an undercoat layer can also be disposed between the substrate 2 and the first conductive layer 3A and between the substrate 2 and the second conductive layer 3B. This undercoat layer includes a polymer such that the adhesiveness between the substrate 2 and the first conductive layer 3A and the adhesiveness between the substrate 2 and the second conductive layer 3B are further improved.

A method of forming the undercoat layer is not particularly limited, and examples thereof include a method of applying a composition for forming an undercoat layer including a polymer to the substrate and optionally performing a heat treatment thereon. In addition, as a composition for forming an undercoat layer including a polymer, for example, gelatin, an acrylic resin, a urethane resin, or an acrylic styrene latex including fine particles of an inorganic material or a polymer may be used.

Optionally, in the conductive member 1 for a touch panel, as a layer other than the above-described undercoat layer, a refractive index adjusting layer may be provided between the substrate 2 and the first conductive layer 3A and between the substrate 2 and the second conductive layer 3B. As the refractive index adjusting layer, for example, an organic layer to which particles of a metal oxide such as zirconium oxide for adjusting a refractive index can be used.

First Conductive Layer and Second Conductive Layer

As a material for forming the first conductive layer 3A and the second conductive layer 3B, a metal or an alloy can be used. For example, the first conductive layer 3A and the second conductive layer 3B can be formed of silver, copper, gold, aluminum, nickel, chromium, molybdenum, or tungsten. It is preferable that the first conductive layer 3A and the second conductive layer 3B include copper. However, the first conductive layer 3A and the second conductive layer 3B may include a metal other than copper, for example, gold or silver. In addition, the first conductive layer 3A and the second conductive layer 3B may include metallic silver, gelatin, or a polymer binder such as an acrylic styrene latex that is suitable for forming a mesh pattern. Other preferable examples of the material include a metal and an alloy of aluminum, silver, molybdenum, and titanium. In addition, a laminated structure of the materials may be used. For example, a fine metal wire having a laminated structure such as molybdenum/copper/molybdenum or molybdenum/aluminum/molybdenum can be used.

Further, for example, the first conductive layer 3A and the second conductive layer 3B may include metal oxide particles, a metal paste such as a silver paste or a copper paste, or metal nanowire particles such as silver nanowire or copper nanowire.

Next, a method of forming the first conductive layer 3A and the second conductive layer 3B will be described. As the method of forming the first conductive layer 3A and the second conductive layer 3B, for example, a sputtering method, a plating method, a silver halide method, or a printing method can be appropriately used.

A method of forming the first conductive layer 3A and the second conductive layer 3B using a sputtering method will be described.

First, by forming a copper foil layer by sputtering and forming a copper wire using the copper foil layer by photolithography, the first conductive layer 3A and the second conductive layer 3B can be formed. The copper foil layer can also be formed by so-called vapor deposition instead of sputtering. As the copper foil layer, an electrolytic copper foil can be used in addition to a sputtered copper foil a vapor deposition copper foil. More specifically, a step of forming copper wires described in JP2014-29614A can be used.

A method of forming the first conductive layer 3A and the second conductive layer 3B using a plating method will be described. For example, the first conductive layer 3A and the second conductive layer 3B can be formed using a metal plating film that is formed on an electroless plating underlayer by performing electroless plating on the underlayer. In this case, the first conductive layer 3A and the second conductive layer 3B are formed by forming a catalyst ink including at least metal fine particles on a substrate in a patterned manner and dipping the substrate in an electroless plating bath to form a metal plating film. More specifically, a method of manufacturing a metal-coated substrate described in JP2014-159620A can be used.

In addition, the first conductive layer 3A and the second conductive layer 3B are formed by forming a resin composition having at least a functional group capable of interacting a metal catalyst precursor on a substrate in a patterned manner, adding a catalyst or catalyst precursor, and dipping the substrate in an electroless plating bath to form a metal plating film. More specifically, a method of manufacturing a metal-coated substrate described in JP2012-144761A can be used.

A method of forming the first conductive layer 3A and the second conductive layer 3B using a silver halide method will be described. First, by exposing a silver halide emulsion layer including silver halide using an exposure pattern for forming the first conductive layer 3A and the second conductive layer 3B and developing the exposed silver halide emulsion layer, the first conductive layer 3A and the second conductive layer 3B can be formed. More specifically, a method of manufacturing the fine metal wire described in JP2012-6377A, JP2014-112512A, JP2014-209332A, JP2015-22397A, JP2016-192200A, or WO2016/157585A can be used.

A method of forming the first conductive layer 3A and the second conductive layer 3B using a printing method will be described. First, by applying a conductive paste including conductive powder to a substrate in the same pattern as the first conductive layer 3A and the second conductive layer 3B and heating the conductive paste, the first conductive layer 3A and the second conductive layer 3B can be formed. The pattern formation using the conductive paste is performed, for example, using an ink jet method or a screen printing method. As the conductive paste, more specifically, a conductive paste described in JP2011-28985A can be used.

Cover Member

As a material of the cover member 5, for example, reinforced glass, polycarbonate, polyethylene terephthalate, or polymethyl methacrylate (PMMA) can be used. The thickness of the cover member 5 is preferably 0.1 mm or more and 1.5 mm or less.

Pressure Sensitive Adhesive

As the pressure sensitive adhesive 4 that bonds the conductive member 1 for a touch panel and the cover member 5 to each other, an optical transparent adhesive sheet (optical clear adhesive: OCA) or an optical transparent adhesive resin (optical clear resin: OCR) can be used, and the thickness thereof is preferably 10 μm or more and 200 μm or less. As the optical transparent adhesive sheet, for example, 8146 series (manufactured by 3M) can be used.

EXAMPLES

The present invention will be described in more detail based on the following examples. Materials, used amounts, ratios, treatment details, and treatment procedures shown in the following examples can be appropriately changed within a range not departing from the scope of the present invention. Accordingly, the scope of the present invention is not limited to the following examples.

Preparation of Silver Halide Emulsion

The following solution 2 and the following solution 3 were simultaneously added for 20 minutes to the following solution 1 held at pH 4.5 and 30° C. in amounts corresponding to 90% of the entire amounts while stirring the solution 1. As a result, nuclear particles having a size of 0.16 μmm were formed. Next, the following solution 4 and the following solution 5 were added to the obtained solution for 8 minutes, and the remaining 10% amounts of the solution 2 and the solution 3 were further added for 2 minutes. As a result, the nuclear particles grew to a size of 0.10 Further, 0.15 g of potassium iodide was added to the obtained solution, and the particles were aged for 5 minutes. Then the formation of the particles was completed.

Solution 1:

| Water | 750 ml |
| Gelatin | 8.6 g |
| Potassium bromide | 3 g |
| 1,3-Dimethylimidazolidine-2-thione | 20 mg |
| Sodium benzenethiolsulfonate | 10 mg |
| Citric acid | 0.7 g |

Solution 2:

| Water | 300 ml |
| Silver nitrate | 150 g |

Solution 3:

| Water | 300 ml |
| Sodium chloride | 38 g |
| Potassium bromide | 32 g |
| Potassium hexachloroiridate (III) | |

-continued

| (0.005% KCl 20% aqueous solution) | 5 ml |
| Ammonium hexachlororhodate | |
| (0.001% NaCl 20% aqueous solution) | 7 ml |

Solution 4:

| Water | 100 ml |
| Silver nitrate | 50 g |

Solution 5:

| Water | 100 ml |
| Sodium chloride | 13 g |
| Potassium bromide | 11 g |
| Yellow prussiate of potash | 5 mg |

Next, the particles were cleaned with water by flocculation using an ordinary method. Specifically, the temperature of the obtained solution was decreased to 35° C., and the pH was decreased (to be in a range of pH 3.6±0.2) using sulfuric acid until silver halide precipitated. Next, about 3 L of the supernatant solution was removed from the obtained solution (first water cleaning). Next, 3 L of distilled water was added to the solution from which the supernatant solution was removed, and sulfuric acid was added until silver halide precipitated. About 3 L of the supernatant solution was removed again from the obtained solution (second water cleaning). By repeating the same operation as the second water cleaning once more (third water cleaning), the water cleaning and desalting step was completed. After the water cleaning and desalting, the emulsion was adjusted to pH 6.4 and pAg 7.5, 2.5 g of gelatin, 10 mg of sodium benzenethiolsulfonate, 3 mg of sodium benzenethiosulfinate, 15 mg of sodium thiosulfate, and 10 mg of chloroauric acid were added, and chemosensitization was performed at 55° C. to obtain the optimum sensitivity. Next, 100 mg of 1,3,3a,7-tetraazaindene as a stabilizer and 100 mg of PROXEL (trade name, manufactured by ICI Co., Ltd.) as a preservative were further added to the obtained emulsion. The finally obtained emulsion was a silver chlorobromide cubic particle emulsion having an average particle diameter (sphere equivalent diameter) of 100 nm and a coefficient of variation of 9%, in which the content of silver iodide was 0.08 mol %, and the ratio of silver chlorobromide was 70 mol % of silver chloride/30 mol % of silver bromide.

1,3,3a,7-tetraazaindene ($1.2 \times 10^{-4}$ mol/mol Ag), hydroquinone ($1.2 \times 10^{-2}$ mol/mol Ag), citric acid ($3.0 \times 10^{4}$ mol/mol Ag), 2,4-dichloro-6-hydroxy-1,3,5-triazine sodium salt (0.90 g/mol Ag), and a small amount of a hardening agent were added to the emulsion to obtain a composition. Next, the pH of the composition was adjusted to 5.6 using citric acid.

A polymer latex (a ratio (mass of dispersant/mass of polymer 1; unit: g/g) of the mass of the dispersant to the mass of a polymer 1 was 0.02 and the solid content was 22 mass %) including a polymer represented by (P-1) (hereinafter, also referred to as "polymer 1"), a dispersant formed of dialkylphenyl polyethylene oxide (PEO) sulfuric acid ester, and water was added to the above-described composition such that a ratio (mass of polymer 1/mass of gelatin; unit: g/g) of the mass of the polymer 1 to the total mass of the gelatin in the composition was 0.25/1. As a result, a polymer latex-containing composition was obtained. Here, in the polymer latex-containing composition, a ratio (mass of gelatin/mass of silver derived from silver halide; unit: g/g) of the mass of the gelatin to the mass of silver derived from silver halide was 0.11.

Further, EPDXY RESIN DY022 (trade name, manufactured by Nagase ChemteX Corporation) as a crosslinking agent was added. The addition amount of the crosslinking agent was adjusted such that the amount of the crosslinking agent in the silver halide-containing photosensitive layer described below was 0.09 g/m$^2$.

This way, the composition for forming a photosensitive layer was prepared.

The polymer 1 was synthesized, for example, with respect to JP3305459B and JP3754745B.

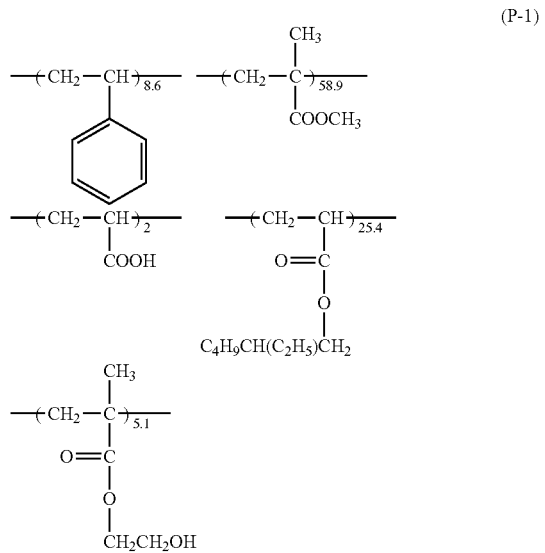

(P-1)

The above-described polymer latex was applied to a polyethylene terephthalate film (a roll-shaped elongated film, manufactured by FUJIFILM Corporation) having a thickness of 40 um, and an undercoat layer having a thickness of 0.05 μm was provided. This treatment was performed by roll-to-roll, and each of the following treatments (steps) was also performed by roll-to-roll. In this case, in the roll, the width was 1 m, and the length was 1000 m.

Step A

Next, a composition for forming a silver halide non-containing layer obtained by mixing the polymer latex and gelatin, the above-described composition for forming a photosensitive layer, and a composition for forming a protective layer obtained by mixing the polymer latex and gelatin were simultaneously applied to the undercoat layer to form a silver halide non-containing layer, a silver halide-containing photosensitive layer, and a protective layer on the undercoat layer.

The thickness of the silver halide non-containing layer was 2.0 μm, the mixing mass ratio (polymer 1/gelatin) of the polymer 1 to the gelatin in the silver halide non-containing layer was 2/1, and the content of the polymer 1 was 1.3 g/m$^2$.

In addition, the thickness of the silver halide-containing photosensitive layer was 2.5 μm, the mixing mass ratio (polymer 1/gelatin) of the polymer 1 to the gelatin in the silver halide-containing photosensitive layer was 0.25/1, and the content of the polymer 1 was 0.19 g/m$^2$.

In addition, the thickness of the protective layer was 0.15 μm, the mixing mass ratio (polymer 1/gelatin) of the polymer 1 to the gelatin in the protective layer was 0.1/1, and the content of the polymer 1 was 0.015 g/m$^2$.

Step B

The prepared photosensitive layer was exposed to parallel light from a high pressure mercury lamp as a light source through a photomask having a pattern corresponding to the first conductive layer 3A shown in FIGS. 2 and 3. In addition, a semi-transmissive film was provided to a portion of a pattern corresponding to the first lead wire 12 in a photomask such that the first external connection terminal 13 that was finally formed was thicker than the first lead wire 12 as shown in FIG. 4. Due to the semi-transmissive film, the exposure amount in the pattern corresponding to the first lead wire 12 is less than the exposure amount in the pattern corresponding to the first external connection terminal 13, and the first external connection terminal 13 that was finally formed was thicker than the first lead wire 12. The exposure amount in the pattern corresponding to the first lead wire 12 was 0.32 times the exposure amount in the pattern corresponding to the first detection electrode 11 and the pattern corresponding to the first external connection terminal 13.

After the exposure, the obtained sample was developed with a developer described below, was further developed using a fixing solution (trade name; N3X-R for CN16X, manufactured by FUJIFILM Corporation), was rinsed with pure water at 25° C., and was dried. As a result, a sample where a silver-containing layer including metallic silver was formed in a mesh pattern was obtained.

Composition of Developer
1 L of the developer included the following compounds.
Hydroquinone: 0.037 mol/L
N-methylamino phenol: 0.016 mol/L
Sodium metaborate: 0.140 mol/L
Sodium hydroxide: 0.360 mol/L
Sodium bromide: 0.031 mol/L
Potassium metabisulfite: 0.187 mol/L The obtained sample was dipped in warm water at 50° C. for 180 seconds. Next, water was drained by air shower, and the sample A was naturally dried.

Step C

The sample obtained in the step B was transported into a superheated steam treatment bath at 110° C., was left to stand for 30 seconds, and was treated with superheated steam. In this case, the flow rate of the steam was 100 kg/h.

Step D

The sample obtained in the step C was dipped in an aqueous proteolytic enzyme solution (40° C.) for 30 seconds. The sample was taken out from the aqueous proteolytic enzyme solution, was dipped in warm water (liquid temperature: 50° C.) for 120 seconds, and was cleaned. Next, water was drained by air shower, and the sample A was naturally dried.

The used aqueous proteolytic enzyme solution was prepared according to the following procedure.

Triethanolamine and sulfuric acid were added to an aqueous solution (concentration of protease: 0.5 mass %) of protease (BIOPRASE 30 L, manufactured by Nagase ChemteX Corporation) to adjust the pH to 8.5.

Step E

The sample obtained in the step D was dipped in 1 mass % of an aqueous glutaric acid solution (74° C.) having a pH of 2.7 for 30 seconds. The sample was taken out from the aqueous glutaric acid solution, was dipped in water at 30° C.

for 5 seconds, and was cleaned. As the glutaric acid, a product manufactured by FUJIFILM Wako Pure Chemical Corporation was used.

Step F

The sample obtained in the step E was dipped in a plating liquid A (30° C.) having the following composition for 5 minutes. The sample was taken out from the plating liquid A, was dipped in water (liquid temperature: 20° C.) for 120 seconds, and was cleaned.

The composition of the plating liquid A (total amount: 1200 ml) was as shown below. The pH of the plating liquid A was 9.9 and was adjusted by adding a predetermined amount of potassium carbonate (manufactured by FUJIFILM Wako Pure Chemical Corporation) thereto. In addition, as all of the following components used, products manufactured by FUJIFILM Wako Pure Chemical Corporation were used. A change in line width before and after the plating treatment was not shown.

Composition of Plating Liquid A

| | |
|---|---|
| AgNO$_3$ | 2.1 g |
| Sodium sulfite | 86 g |
| Sodium thiosulfate pentahydrate | 60 g |

| | |
|---|---|
| ARON T-50 (manufactured by TOAGOSEI Co., Ltd., concentration of solid contents: 40%) | 36 g |
| Methylhydroquinone | 13 g |
| Potassium carbonate | a predetermined amount |
| Water | remainder |

Step G

The sample obtained in the step F was dipped a solution (liquid temperature: 50° C.) including water and diethylene glycol monoethyl ether at a mass ratio (water/diethylene glycol monoethyl ether) of 30/70 for 60 seconds. Next, the obtained sample was dipped in water (liquid temperature: 30° C.) for 30 seconds, and was cleaned.

Step H

The sample obtained in the step G was transported into a superheated steam treatment bath at 110° C., was left to stand for 30 seconds, and was treated with superheated steam. In this case, the flow rate of the steam was 100 kg/h. As a result, a conductive member for a touch panel according to Example 1 was prepared.

By performing the following (Conductive Treatment Step) and (Cutting and Observation Step) on the conductive member for a touch panel according to Example 1, the thickness D1 of the first external connection terminal 13 and the thickness D2 of the first lead wire 12 in Example 1 were measured, and a ratio D1/D2 of the thickness D1 of the first external connection terminal 13 to the thickness D2 of the first lead wire 12 was calculated.

Conductive Treatment Step

Carbon having a thickness of 10 nm was vapor-deposited on the first conductive layer 3A using a vacuum deposition device (IB-29510VET, manufactured by JEOL Ltd.). Next, platinum having a thickness of 10 nm was vapor-deposited on the carbon having a thickness of 10 nm using a sputtering vapor deposition device (E-1030 ion sputter, manufactured by Hitachi Ltd.)

Cutting and Observation Step

Any 10 positions in the plurality of first lead wires 12 and any 10 positions in the plurality of first external connection terminals 13 were selected. Next, using a FIB function of a focused ion beam (FIB)-scanning electron microscope (SEM) composite device (Helios 600i, manufactured by Thermo Fisher Scientific Inc.), cross-section cutting was performed on all of the selected positions under conditions of a Ga$^+$ acceleration voltage of 30 kV and a surface protective film Pt-CVD. As a result, at each of the selected 10 positions of the first lead wires 12, a cross-section of the first lead wire that was cut along a surface perpendicular to the extending direction of the first lead wire 12 was exposed. At each of the selected 10 positions of the first external connection terminals 13, a cross-section of the first external connection terminal 13 that was cut along a surface perpendicular to the extending direction of the first external connection terminal 13 was exposed.

Further, using a SEM function of the same FIB-SEM composite device, the cross-sections of the exposed 10 positions in the first external connection terminals 13 were observed under conditions of a secondary backscattered electron image, an acceleration voltage of 1 kV, a probe current of 86 pA, and W.D. 4 mm, and the thickness D1 of the first external connection terminal 13 at each of the 10 positions was measured. In addition, the cross-sections of the exposed 10 positions in the first lead wires 12 were observed using the same method as described above, and the thickness D2 of the first lead wire 12 at each of the 10 positions was measured.

Finally, by calculating the average value of the thicknesses D1 measured at the 10 positions of the first external connection terminals 13 and the average value of the thicknesses D2 measured at the 10 positions of the first lead wires 12, the final values of the thickness D1 and the thickness D2 were obtained. In addition, the ratio D1/D2 of the thickness D1 to the thickness D2 obtained as described above was calculated.

As a result of the calculation, the thickness D1 of the first external connection terminal 13 was 2.40 μmm, and the thickness D2 of the first lead wire 12 was 0.90 μmm. In addition, the ratio D1/D2 of the thickness D2 of the first lead wire 12 to the thickness D1 of the first external connection terminal 13 was 2.67.

Example 2

A conductive member for a touch panel according to Example 2 was prepared using the same method as that of Example 1, except that, in the step B, a semi-transmissive film was provided to the pattern corresponding to the first external connection terminal 13 such that the exposure amount in the pattern of the photomask corresponding to the first external connection terminal 13 was 0.70 times the exposure amount in the pattern corresponding to the first detection electrode 11.

In the conductive member for a touch panel according to Example 2, using the same method as that of Example 1, the thickness D1 of the first external connection terminal 13 and the thickness D2 of the first lead wire 12 were measured, and the ratio D1/D2 was calculated. In Example 2, the thickness D1 of the first external connection terminal 13 was 2.00 μmm, the thickness D2 of the first lead wire 12 was 0.90 μmm, and the ratio D1/D2 was 2.22.

Example 3

A conductive member for a touch panel according to Example 3 was prepared using the same method as that of Example 1, except that, in the step B, a semi-transmissive film was provided to the pattern corresponding to the first external connection terminal 13 such that the exposure amount in the pattern of the photomask corresponding to the first external connection terminal 13 was 0.50 times the exposure amount in the pattern corresponding to the first detection electrode 11.

In the conductive member for a touch panel according to Example 3, using the same method as that of Example 1, the thickness D1 of the first external connection terminal 13 and the thickness D2 of the first lead wire 12 were measured, and the ratio D1/D2 was calculated. In Example 3, the thickness D1 of the first external connection terminal 13 was 1.30 µm, the thickness D2 of the first lead wire 12 was 0.90 µm, and the ratio D1/D2 was 1.44.

Example 4

A conductive member for a touch panel according to Example 4 was prepared using the same method as that of Example 1, except that, in the step B, a semi-transmissive film was provided to the pattern corresponding to the first external connection terminal 13 such that the exposure amount in the pattern of the photomask corresponding to the first external connection terminal 13 was 0.35 times the exposure amount in the pattern corresponding to the first detection electrode 11.

In the conductive member for a touch panel according to Example 4, using the same method as that of Example 1, the thickness D1 of the first external connection terminal 13 and the thickness D2 of the first lead wire 12 were measured, and the ratio D1/D2 was calculated. In Example 4, the thickness D1 of the first external connection terminal 13 was 1.10 µm, the thickness D2 of the first lead wire 12 was 0.90 µm, and the ratio D1/D2 was 1.22.

Example 5

A conductive member for a touch panel according to Example 5 was prepared using the same method as that of Example 1, except that, in the step B, a semi-transmissive film was provided to the pattern corresponding to the first external connection terminal 13 such that the exposure amount in the pattern of the photomask corresponding to the first external connection terminal 13 was 0.35 times the exposure amount in the pattern corresponding to the first detection electrode 11 and a semi-transmissive film was provided to the pattern corresponding to the first lead wire 12 such that the exposure amount in the pattern of the photomask corresponding to the first lead wire 12 was 0.25 times the exposure amount in the pattern corresponding to the first detection electrode 11.

In the conductive member for a touch panel according to Example 5, using the same method as that of Example 1, the thickness D1 of the first external connection terminal 13 and the thickness D2 of the first lead wire 12 were measured, and the ratio D1/D2 was calculated. In Example 5, the thickness D1 of the first external connection terminal 13 was 1.10 µm, the thickness D2 of the first lead wire 12 was 0.70 µm, and the ratio D1/D2 was 1.22.

A conductive member for a touch panel according to Example 6 was prepared using the same method as that of Example 1, except that, in the step B, the exposure time to the first external connection terminal 13 increased such that the exposure amount in the pattern of the photomask corresponding to the first external connection terminal 13 was 1.15 times the exposure amount in the pattern corresponding to the first detection electrode 11.

In the conductive member for a touch panel according to Example 6, using the same method as that of Example 1, the thickness D1 of the first external connection terminal 13 and the thickness D2 of the first lead wire 12 were measured, and the ratio D1/D2 was calculated. In Example 6, the thickness D1 of the first external connection terminal 13 was 2.70 µm, the thickness D2 of the first lead wire 12 was 0.90 µm, and the ratio D1/D2 was 3.00.

Example 7

A conductive member for a touch panel according to Example 7 was prepared using the same method as that of Example 1, except that, in the step B, a semi-transmissive film was provided to the pattern corresponding to the first external connection terminal 13 such that the exposure amount in the pattern of the photomask corresponding to the first external connection terminal 13 was 0.50 times the exposure amount in the pattern corresponding to the first detection electrode 11 and a semi-transmissive film was provided to the pattern corresponding to the first lead wire 12 such that the exposure amount in the pattern of the photomask corresponding to the first lead wire 12 was 0.40 times the exposure amount in the pattern corresponding to the first detection electrode 11.

In the conductive member for a touch panel according to Example 7, using the same method as that of Example 1, the thickness D1 of the first external connection terminal 13 and the thickness D2 of the first lead wire 12 were measured, and the ratio D1/D2 was calculated. In Example 7, the thickness D1 of the first external connection terminal 13 was 1.30 µm, the thickness D2 of the first lead wire 12 was 1.10 µm, and the ratio D1/D2 was 1.18.

Example 8

A conductive member for a touch panel according to Example 8 was prepared using the same method as that of Example 1, except that, in the step B, a semi-transmissive film was provided to the pattern corresponding to the first external connection terminal 13 such that the exposure amount in the pattern of the photomask corresponding to the first external connection terminal 13 was 0.31 times the exposure amount in the pattern corresponding to the first detection electrode 11 and a semi-transmissive film was provided to the pattern corresponding to the first lead wire 12 such that the exposure amount in the pattern of the photomask corresponding to the first lead wire 12 was 0.25 times the exposure amount in the pattern corresponding to the first detection electrode 11.

In the conductive member for a touch panel according to Example 8, using the same method as that of Example 1, the thickness D1 of the first external connection terminal 13 and the thickness D2 of the first lead wire 12 were measured, and the ratio D1/D2 was calculated. In Example 8, the thickness D1 of the first external connection terminal 13 was 0.90 µmm, the thickness D2 of the first lead wire 12 was 0.70 µmm, and the ratio D1/D2 was 1.29.

Comparative Example 1

A conductive member for a touch panel according to Comparative Example 1 was prepared using the same method as that of Example 1, except that, in the step B, a semi-transmissive film was not provided to the pattern of the photomask corresponding to the first lead wire 12 and the exposure amount in the pattern corresponding to the first detection electrode 11, the exposure amount in the pattern corresponding to the first lead wire 12, and the exposure amount in the first external connection terminal 13 were the same as each other.

In the conductive member for a touch panel according to Comparative Example 1, using the same method as that of Example 1, the thickness D1 of the first external connection terminal 13 and the thickness D2 of the first lead wire 12 were measured, and the ratio D1/D2 was calculated. In Comparative Example 1, the thickness D1 of the first external connection terminal 13 was 2.40 μmm, the thickness D2 of the first lead wire 12 was 2.60 μmm, and the ratio D1/D2 was 0.92.

Comparative Example 2

A conductive member for a touch panel according to Comparative Example 2 was prepared using the same method as that of Example 1, except that, in the step B, a semi-transmissive film was provided to the pattern corresponding to the first external connection terminal 13 such that the exposure amount in the pattern of the photomask corresponding to the first external connection terminal 13 was 0.50 times the exposure amount in the pattern corresponding to the first detection electrode 11 and a semi-transmissive film was provided to the pattern corresponding to the first lead wire 12 such that the exposure amount in the pattern of the photomask corresponding to the first lead wire 12 was 0.50 times the exposure amount in the pattern corresponding to the first detection electrode 11.

In the conductive member for a touch panel according to Comparative Example 2, using the same method as that of Example 1, the thickness D1 of the first external connection terminal 13 and the thickness D2 of the first lead wire 12 were measured, and the ratio D1/D2 was calculated. In Comparative Example 2, the thickness D1 of the first external connection terminal 13 was 1.30 μm, the thickness D2 of the first lead wire 12 was 1.50 μm, and the ratio D1/D2 was 0.87.

Comparative Example 3

A conductive member for a touch panel according to Comparative Example 3 was prepared using the same method as that of Example 1, except that, in the step B, a semi-transmissive film was provided to the pattern corresponding to the first external connection terminal 13 such that the exposure amount in the pattern of the photomask corresponding to the first external connection terminal 13 was 0.25 times the exposure amount in the pattern corresponding to the first detection electrode 11 and a semi-transmissive film was provided to the pattern corresponding to the first lead wire 12 such that the exposure amount in the pattern of the photomask corresponding to the first lead wire 12 was 0.25 times the exposure amount in the pattern corresponding to the first detection electrode 11.

In the conductive member for a touch panel according to Comparative Example 3, using the same method as that of Example 1, the thickness D1 of the first external connection terminal 13 and the thickness D2 of the first lead wire 12 were measured, and the ratio D1/D2 was calculated. In Comparative Example 3, the thickness D1 of the first external connection terminal 13 was 0.60 μm, the thickness D2 of the first lead wire 12 was 0.70 μm, and the ratio D1/D2 was 0.86.

Comparative Example 4

A conductive member for a touch panel according to Comparative Example 4 was prepared using the same method as that of Example 1, except that, in the step B, the exposure time to the first external connection terminal 13 increased such that the exposure amount in the pattern of the photomask corresponding to the first external connection terminal 13 was 1.35 times the exposure amount in the pattern corresponding to the first detection electrode 11.

In the conductive member for a touch panel according to Comparative Example 4, using the same method as that of Example 1, the thickness D1 of the first external connection terminal 13 and the thickness D2 of the first lead wire 12 were measured, and the ratio D1/D2 was calculated. In Comparative Example 4, the thickness D1 of the first external connection terminal 13 was 3.00 μm, the thickness D2 of the first lead wire 12 was 0.90 μm, and the ratio D1/D2 was 3.33.

Comparative Example 5

A conductive member for a touch panel according to Comparative Example 5 was prepared using the same method as that of Example 1, except that, in the step B, a semi-transmissive film was provided to the pattern corresponding to the first external connection terminal 13 such that the exposure amount in the pattern of the photomask corresponding to the first external connection terminal 13 was 0.70 times the exposure amount in the pattern corresponding to the first detection electrode 11 and a semi-transmissive film was provided to the pattern corresponding to the first lead wire 12 such that the exposure amount in the pattern of the photomask corresponding to the first lead wire 12 was 0.23 times the exposure amount in the pattern corresponding to the first detection electrode 11.

In the conductive member for a touch panel according to Comparative Example 5, using the same method as that of Example 1, the thickness D1 of the first external connection terminal 13 and the thickness D2 of the first lead wire 12 were measured, and the ratio D1/D2 was calculated. In Comparative Example 5, the thickness D1 of the first external connection terminal 13 was 2.00 μm, the thickness D2 of the first lead wire 12 was 0.65 μm, and the ratio D1/D2 was 3.08.

Comparative Example 6

A conductive member for a touch panel according to Comparative Example 6 was prepared using the same method as that of Example 1, except that, in the step B, a semi-transmissive film was provided to the pattern corresponding to the first external connection terminal 13 such that the exposure amount in the pattern of the photomask corresponding to the first external connection terminal 13 was 0.50 times the exposure amount in the pattern corresponding to the first detection electrode 11 and a semi-transmissive film was provided to the pattern corresponding to the first lead wire 12 such that the exposure amount in the pattern of the photomask corresponding to the first lead wire 12 was 0.40 times the exposure amount in the pattern corresponding to the first detection electrode 11.

In the conductive member for a touch panel according to Comparative Example 6, using the same method as that of Example 1, the thickness D1 of the first external connection terminal 13 and the thickness D2 of the first lead wire 12 were measured, and the ratio D1/D2 was calculated. In Comparative Example 6, the thickness D1 of the first external connection terminal 13 was 1.50 μm, the thickness D2 of the first lead wire 12 was 0.40 μm, and the ratio D1/D2 was 3.75.

Regarding the conductive members for a touch panel according to Examples 1 to 8 and Comparative Examples 1 to 6 manufactured as described above, the evaluation of the following resistance increase rate was performed.

Evaluation of Resistance Increase Rate

First, a first wire resistance value N1 of any boundary portion between the first external connection terminal 13 and the first lead wire 12 that was selected was measured. In this case, four microprobes (tungsten probes manufactured by Micro Support Co., Ltd., diameter: 0.5 μm) were brought into contact with four different positions along the first external connection terminal 13 and the first lead wire 12 such that the four positions included a boundary portion between the first external connection terminal 13 and the first lead wire 12. Next, a constant current was caused to flow through two microprobes positioned on opposite ends of the outer side using a source meter (2400 general-purpose source meter, manufactured by Keithley Instruments Inc.) such that a voltage between two microprobes positioned on the inner side was 5 mV, and a resistance value between the two microprobes positioned on the inner side was measured. Further, by dividing the measured resistance value by the distance between the two microprobes positioned on the inner side, the first wire resistance value N1 of the boundary portion between the first external connection terminal 13 and the first lead wire 12 was calculated.

In addition, a first wire resistance value M1 of the first lead wire 12 of the conductive member for a touch panel was calculated using the same method as described above.

Figure 6:
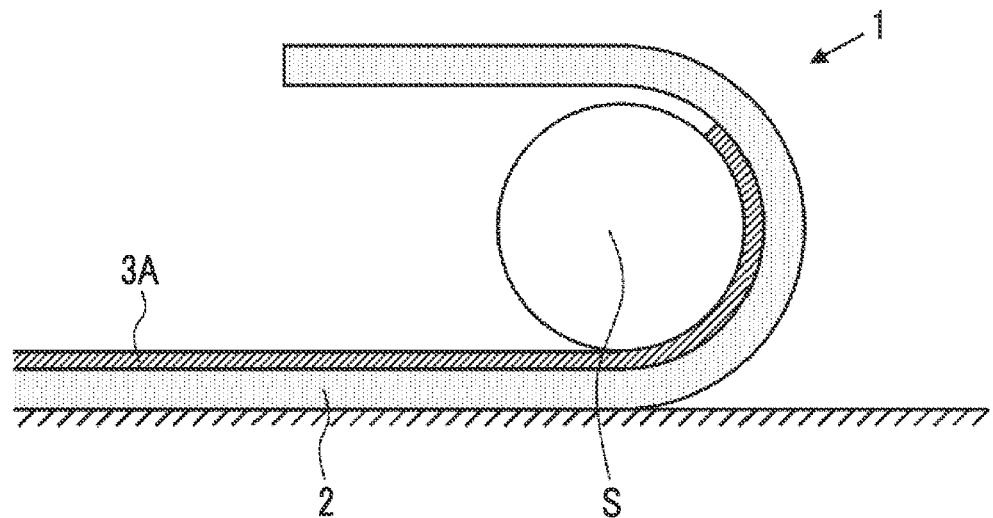
FIG. 6 is a diagram schematically showing a conductive member for a touch panel that is bent along a side surface of a cylindrical rod.

Next, the conductive member for a touch panel was disposed on a flat table, and a cylindrical rod S having a diameter of 0.9 mm was disposed in a direction perpendicular to an extending direction of the first external connection terminal 13. Further, in a state where the boundary portion between the first lead wire 12 and the first external connection terminal 13 was brought into contact with the rod S, the conductive member for a touch panel was bent by 180° along a side surface of the cylindrical shape of the rod S as shown in FIG. 6. FIG. 6 shows the state where the conductive member 1 for a touch panel was bent along the side surface of the rod S in a state where the first conductive layer 3A was brought into contact with the rod S. Next, the conductive member for a touch panel was returned to a flat state. This operation was repeated five times.

In addition, the conductive member for a touch panel was disposed on a flat table, and a cylindrical rod S having a diameter of 0.9 mm was disposed in a direction perpendicular to an extending direction of the first lead wire 12. Further, in a state where the first lead wire 12 perpendicular to the rod S was brought into contact with the rod S, the conductive member for a touch panel was bent by 180° along a side surface of the cylindrical shape of the rod S. Next, the conductive member for a touch panel was returned to a flat state. This operation was repeated ten times.

Next, a second wire resistance value N2 of the first external connection terminal 13 that was bent five times was measured using the same method as the method of measuring the first wire resistance value N1 of the first external connection terminal 13. In addition, a second wire resistance value M2 of the first lead wire 12 that was bent ten times was measured using the same method as the method of measuring the first wire resistance value M1 of the first lead wire 12.

Finally, by calculating ratios N2/N1×100% and M2/M1×100% between the first wire resistance values N1 and M1 and the second wire resistance values N2 and M2, a resistance increase rate of the boundary portion between the first external connection terminal 13 and the first lead wire 12 and a resistance increase rate of the first lead wire 12 were calculated. A conductive member for a touch panel where the resistance increase rate of the first external connection terminal 13 was less than 5% was evaluated as A where the boundary portion had excellent bending resistance, a conductive member for a touch panel where the resistance increase rate of the first external connection terminal 13 was 5% or more and less than 10% was evaluated as B where the boundary portion had sufficient bending resistance, and a conductive member for a touch panel where the resistance increase rate of the first external connection terminal 13 was 10% or more was evaluated as C where the boundary portion did not have sufficient bending resistance.

In addition, the resistance increase rates of the first lead wires 12 in the conductive members for a touch panel were evaluated as A to C based on the same standards as those of the resistance increase rate of the boundary portion between the first external connection terminal 13 and the first lead wire 12.

In a case where the resistance increase rate of the boundary portion between the first external connection terminal 13 and the first lead wire 12 was evaluated as C, the evaluation was stopped at this time, and the evaluation of the resistance increase rate of the first lead wire 12 was not performed.

Table 1 below shows the evaluation results for Examples 1 to 8 and Comparative Examples 1 to 6. In Table 1, the boundary portion between the first external connection terminal 13 and the first lead wire 12 is simply shown as the boundary portion. In addition, in Table 1, "–" shows that the evaluation was not performed. In addition, the item "Exposure Amount relative to Exposure amount of First Detection Electrode" shows what times the exposure amount of the first external connection terminal 13 or the exposure amount of the first lead wire 12 was relative to the exposure amount of the first detection electrode 11. For example, "×0.32" represents that the exposure amount was 0.32 times relative to the exposure amount of the first detection electrode 11.

TABLE 1

| | First External Connection Terminal | | First Lead Wire | | | Evaluation of Resistance Increase Rate | | | |
| --- | --- | --- | --- | --- | --- | --- | --- | --- | --- |
| | Thickness D1 | Exposure Amount relative to Exposure Amount of First Detection Electrode | Thickness D2 | Exposure Amount relative to Exposure Amount of First Detection Electrode | Thickness Ratio D1/D2 | Resistance Increase Rate of Boundary Portion | Resistance Increase Rate of First Lead Wire | Boundary Portion | First Lead Wire |
| Example 1 | 2.40 μm | ×1.00 | 0.90 μm | ×0.32 | 2.67 | 2.8% | 0.6% | A | A |
| Example 2 | 2.00 μm | ×0.70 | 0.90 μm | ×0.32 | 2.22 | 0.5% | 0.2% | A | A |

TABLE 1-continued

| | First External Connection Terminal | | First Lead Wire | | | Evaluation of Resistance Increase Rate | | | |
|---|---|---|---|---|---|---|---|---|---|
| | Thickness D1 | Exposure Amount relative to Exposure Amount of First Detection Electrode | Thickness D2 | Exposure Amount relative to Exposure Amount of First Detection Electrode | Thickness Ratio D1/D2 | Resistance Increase Rate of Boundary Portion | Resistance Increase Rate of First Lead Wire | Boundary Portion | First Lead Wire |
| Example 3 | 1.30 μm | ×0.50 | 0.90 μm | ×0.32 | 1.44 | 1.6% | 0.2% | A | A |
| Example 4 | 1.10 μm | ×0.35 | 0.90 μm | ×0.32 | 1.22 | 1.2% | 0.5% | A | A |
| Example 5 | 1.10 μm | ×0.35 | 0.70 μm | ×0.25 | 1.57 | 3.1% | 1.5% | A | A |
| Example 6 | 2.70 μm | ×1.15 | 0.90 μm | ×0.32 | 3.00 | 2.7% | 3.9% | A | A |
| Example 7 | 1.30 μm | ×0.50 | 1.10 μm | ×0.40 | 1.18 | 5.1% | 6.7% | B | B |
| Example 8 | 0.90 μm | ×0.31 | 0.70 μm | ×0.25 | 1.29 | 7.4% | 6.5% | B | B |
| Comparative Example 1 | 2.40 μm | ×1.00 | 2.60 μm | ×1.00 | 0.92 | 6.0% | 11.5% | B | C |
| Comparative Example 2 | 1.30 μm | ×0.50 | 1.50 μm | ×0.50 | 0.87 | 5.4% | 19.9% | B | C |
| Comparative Example 3 | 0.60 μm | ×0.25 | 0.70 μm | ×0.25 | 0.86 | 14.1% | — | C | — |
| Comparative Example 4 | 3.00 μm | ×1.35 | 0.90 μm | ×0.32 | 3.33 | 12.6% | — | C | — |
| Comparative Example 5 | 2.00 μm | ×0.70 | 0.65 μm | ×0.23 | 3.08 | 12.3% | — | C | — |
| Comparative Example 6 | 1.50 μm | ×0.50 | 0.40 μm | ×0.14 | 3.75 | 15.2% | — | C | — |

As shown in Table 1, it can be seen that, in the conductive members for a touch panel according to Examples 1 to 6, both of the evaluation of the resistance increase rate of the boundary portion between the first external connection terminal 13 and the first lead wire 12 and the evaluation of the resistance increase rate of the first lead wire 12 were A, and resistance against bending was excellent. In addition, it can be seen that, in the conductive members for a touch panel according to Examples 7 and 8, both of the evaluation of the resistance increase rate of the boundary portion between the first external connection terminal 13 and the first lead wire 12 and the evaluation of the resistance increase rate of the first lead wire 12 were B, and resistance against bending was sufficient.

In all of the conductive members for a touch panel according to Examples 1 to 8, the value of the thickness ratio D1/D2 was more than 1.00 and 3.00 or less, and Inequality (1) was satisfied. As a result, concentration of stress on a boundary portion between the first external connection terminal 13 and the first lead wire 12 was suppressed, and the evaluation of the resistance increase rate of the boundary portion between the first external connection terminal 13 and the first lead wire 12 was A or B.

In addition, in all of Examples 1 to 6, the thickness D1 of the first external connection terminal 13 was 1.00 μm or more, and the thickness D2 of the first lead wire 12 was 1.00 μm or less. Therefore, it is presumed that the first external connection terminal 13 and the first lead wire 12 were strong against bending, and both of the evaluation of the resistance increase rate of the boundary portion between the first external connection terminal 13 and the first lead wire 12 and the evaluation of the resistance increase rate of the first lead wire 12 were A.

In addition, in all of Examples 7 and 8, only one of the condition that the thickness D1 of the first external connection terminal 13 was 1.00 μm or more or the condition that the thickness D2 of the first lead wire 12 was 1.00 μm or less was satisfied. Therefore, it is presumed that only one of the first external connection terminal 13 or the first lead wire 12 was strong against bending, and both of the evaluation of the resistance increase rate of the boundary portion between the first external connection terminal 13 and the first lead wire 12 and the evaluation of the resistance increase rate of the first lead wire 12 were B.

In Comparative Examples 1 and 2, the evaluation of the resistance increase rate of the first lead wire 12 were C. In Comparative Examples 3 to 6, the evaluation of the resistance increase rate of the boundary portion between the first external connection terminal 13 and the first lead wire 12 was C. It is presumed that, in Comparative Examples 1 to 3, the first external connection terminal 13 was thinner than the first lead wire 12, the fracture of the first external connection terminal 13 or the first lead wire 12 was suppressed due to the bending of the conductive member for a touch panel. In addition, in Comparative Examples 4 to 6, the first external connection terminal 13 was thicker than the first lead wire 12, and the thickness ratio D1/D2 was more than 3.00. Therefore, it is presumed that stress was likely to concentrate on the boundary portion between the first external connection terminal 13 and the first lead wire 12, and the boundary portion was likely to be fractured.

Basically, the present invention is configured as described above. Hereinabove, the conductive member for a touch panel according to the embodiment of the present invention has been described in detail. However, the present invention is not limited to the above-described examples, and various improvements or modifications can be made within a range not departing from the scope of the present invention.

EXPLANATION OF REFERENCES

1: conductive member for a touch panel
2: substrate
2A: first surface
2B: second surface
3A: first conductive layer
3B: second conductive layer
4: pressure sensitive adhesive
5: cover member
11: first detection electrode
12: first lead wire
13: first external connection terminal
21: second detection electrode 22: second lead wire
23: second external connection terminal
D1, D2: thickness
P: touch panel
S: rod
W1: line width
W2: terminal width

What is claimed is:

1. A conductive member for a touch panel, comprising:
a substrate; and
a conductive layer that is disposed on at least one surface of the substrate,
wherein the conductive layer includes a plurality of detection electrodes, a plurality of lead wires led from the plurality of detection electrodes, and a plurality of external connection terminals connected to the plurality of lead wires, and
a ratio of a thickness D1 of the external connection terminal to a thickness D2 of the lead wire satisfies Inequality (1), $$1.00 < D1/D2 \leq 3.00 \qquad (1).$$

2. The conductive member for a touch panel according to claim 1,
wherein the thickness D1 of the external connection terminal is more than 1.00 µm.

3. The conductive member for a touch panel according to claim 1,
wherein the thickness D2 of the lead wire is less than 1.00 µm.

4. The conductive member for a touch panel according to claim 1,
wherein the substrate is a transparent insulating substrate.

5. The conductive member for a touch panel according to claim 1,
wherein the substrate has flexibility.

6. A touch panel comprising:
the conductive member for a touch panel according to claim 1.

7. The conductive member for a touch panel according to claim 1,
wherein the conductive layer has a silver-containing layer including metallic silver and a metal plating layer.

* * * * *